(No Model.)

C. C. KILTS.
CAR DOOR.

No. 273,290. Patented Mar. 6, 1883.

Attest:
Thos. L. Jones.
Solon C. Papp.

Inventor:
Christopher C. Kilts
by C. D. Moody,
atty

N. PETERS, Photo-Lithographer, Washington, D. C.

UNITED STATES PATENT OFFICE.

CHRISTOPHER C. KILTS, OF HANNIBAL, MISSOURI.

CAR-DOOR.

SPECIFICATION forming part of Letters Patent No. 273,290, dated March 6, 1883.

Application filed September 22, 1882. (No model.)

*To all whom it may concern:*

Be it known that I, CHRISTOPHER C. KILTS, of Hannibal, Missouri, have made a new and useful Improvement in Railway-Car Doors, of which the following is a full, clear, and exact description, reference being had to the annexed drawings, making part of this specification, in which—

Figure 1:
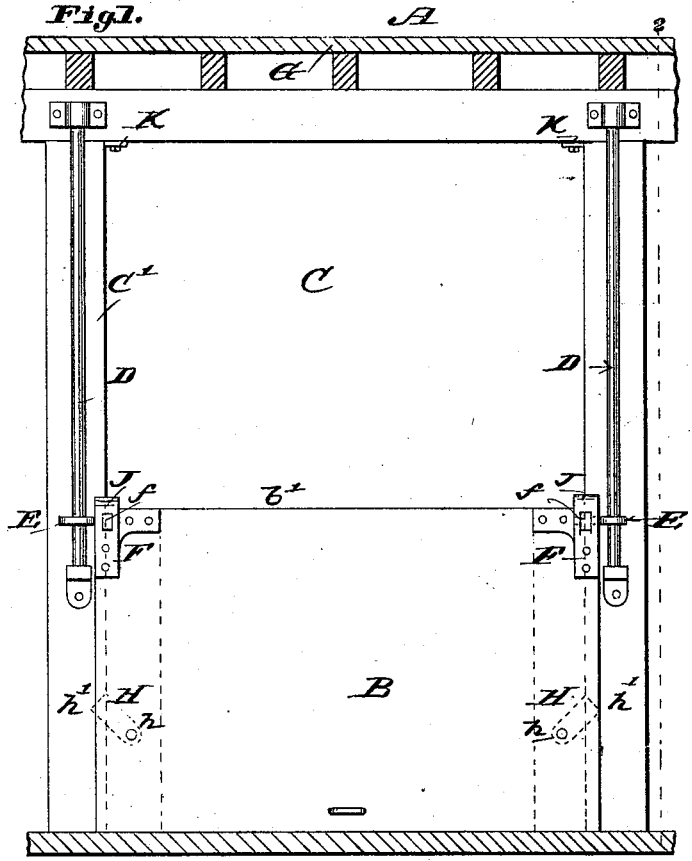
Figure 2:
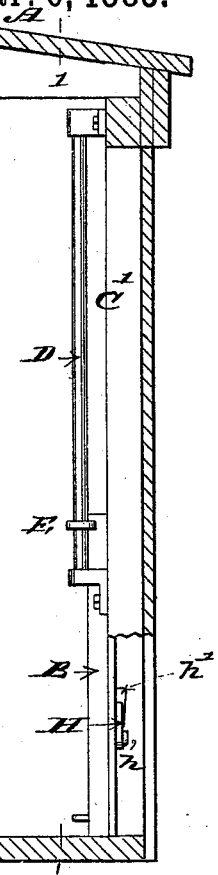
Figures 3, 4:
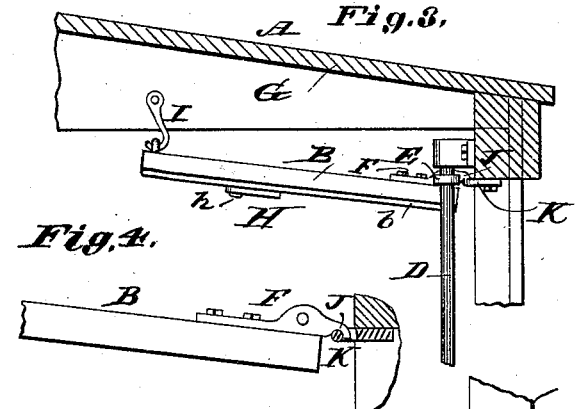
Figure 5:
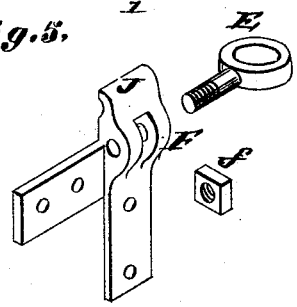
Figure 6:
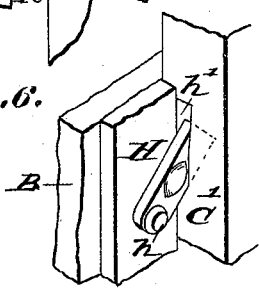

Figure 1 is a vertical longitudinal section taken through a car having the improvement, the section being taken on the line 1 1 of Fig. 2, and showing only that portion of the car with which the improvement is immediately connected; Fig. 2, a vertical transverse section, partly broken away, taken on the line 2 2 of Fig. 1, the door being down; Fig. 3, a similar transverse section, the door being raised; and Figs. 4, 5, 6, details, Fig. 4 showing the mode of supporting the outer edge of the door when raised and upturned, Fig. 5 a view showing detached the various parts of one of the door-hinges, and Fig. 6 a view showing the mode of fastening the door at the lower end.

The same letters denote the same parts.

The present invention is an improvement adapted more especially to cars for carrying grain. In such cars it is the practice to employ an inner door, which extends from the floor of the car upward sufficiently to inclose the grain—say half-way, or thereabout, up the doorway. The improvement relates to the mode of operating and fastening this inner door.

A represents a car having the improvement. B represents the inner door in question. Saving the improvement, the car and the door are of the usual description. The door is made to be moved upward and downward in the doorway, from the floor to the roof of the car, and when raised to be upturned out of the way and secured to the car-roof, and when turned down and dropped to be secured to the door-frame.

The preferable mode of carrying out the improvement is shown in the drawings.

C is the doorway, the lower part of which the door B is designed to close. At each side of the doorway are guides D D. The door, at or near its upper end, is connected with the guides by means of the eyes E E, which are journaled in the lugs F F upon the door. The eyes may be fastened in the lugs by means of a nut, *f*. Any form of connection, however, will answer for uniting the door and guides, and any form of guide will do, provided the door can be raised and lowered, and when raised upturned to the car-roof G, as described.

In Figs. 1, 2 the door is shown down. In this position the door is secured from being jolted upward by means of the catches H H, the catches being pivoted to the door at *h h* to enable them to be turned to engage in the recesses *h' h'* in the door-frame C'. The catches, when thus turned, also aid in confining the door laterally. The door, however, is rabbeted at *b* to prevent its being pressed laterally outward through the doorway.

In Figs. 3, 4 the door is shown raised and upturned, the operation being as follows: The door is raised upon the guides D D until the upper edge of the door is well up to the top of the doorway. The door is then turned upon the eyes E E as upon journals, bringing the door into the position shown in Figs. 3, 4. The door is then, by means of a suitable fastening—such as the hook I—secured to the roof G of the car. In this position the edge *b'* of the door is prevented from falling by reason of the lugs J J, with which the door is furnished, coming over the projections K K of the door-frame C'. The lugs J J are conveniently made in one piece with the lugs F F, substantially as shown.

The present improvement is applicable to other than car-doors.

The present door is more convenient than the one hitherto in use, as well as more secure. When the door is raised it is entirely out of the way, and in a position in which it is not liable to injury from freight when the car is being used in carrying other freight than grain.

I am aware of and disclaim the construction such as shown in Schellert's patent of May 6, 1879.

I claim—

1. The combination, in the car A, of the door B, the guides D D, the eyes E E, the lugs F F, the lugs J J, the projections K K, and the catch I, substantially as described.

2. The combination, in the car A, of the door B, the door-frame C', the guides D D, the catches H H, the eyes E E, the lugs F F J J, the projections K K, and the catch I, substantially as described.

CHRISTOPHER C. KILTS.

Witnesses:
THOMAS H. BACON,
L. L. SUYDAM.